(12) United States Patent
Klingler

(10) Patent No.: US 11,319,978 B2
(45) Date of Patent: May 3, 2022

(54) MAGNETIC BRACKET ASSEMBLY FOR MODULAR FURNITURE SYSTEM

(71) Applicant: Scott Jerome Klingler, San Antonio, TX (US)

(72) Inventor: Scott Jerome Klingler, San Antonio, TX (US)

( * ) Notice: Subject to any disclaimer, the term of this patent is extended or adjusted under 35 U.S.C. 154(b) by 0 days.

(21) Appl. No.: 16/249,450

(22) Filed: Jan. 16, 2019

(65) Prior Publication Data
US 2020/0224693 A1 Jul. 16, 2020

(51) Int. Cl.
*A47B 47/00* (2006.01)
*F16B 12/44* (2006.01)
*F16B 1/00* (2006.01)
*F16B 12/10* (2006.01)
*A47B 3/06* (2006.01)

(52) U.S. Cl.
CPC ............... *F16B 12/44* (2013.01); *A47B 3/06* (2013.01); *A47B 47/0075* (2013.01); *F16B 1/00* (2013.01); *F16B 12/10* (2013.01); *F16B 2001/0035* (2013.01); *F16B 2012/443* (2013.01)

(58) Field of Classification Search
CPC ..... A74B 57/42; A74F 5/0853; A47B 96/028; A47B 47/022; A47B 96/06; A47F 5/08
USPC ........... 248/235, 250, 220.1, 220.21, 220.22, 248/225.11, 225.21
See application file for complete search history.

(56) References Cited

U.S. PATENT DOCUMENTS

| | | | | |
|---|---|---|---|---|
| 4,399,856 A * | 8/1983 | Anderson | ............... | A47H 1/104 160/39 |
| 5,456,435 A * | 10/1995 | Sweeney | ................ | A47B 57/40 211/90.01 |
| 6,105,794 A * | 8/2000 | Bauer | .................... | A47B 57/26 108/108 |
| 6,481,678 B1 * | 11/2002 | Chong | ................... | H02G 3/288 211/192 |
| 6,672,359 B2 * | 1/2004 | Morris | ..................... | A47H 2/00 160/19 |
| 2007/0181759 A1 * | 8/2007 | Young | .................. | A47B 96/027 248/235 |
| 2011/0011994 A1 * | 1/2011 | Ahlstrom | ............... | A47G 1/168 248/205.4 |
| 2014/0061409 A1 * | 3/2014 | Mayhew, Jr. | .......... | F16M 13/02 248/206.5 |
| 2019/0200762 A1 * | 7/2019 | Wang | ................... | A47B 97/001 |

* cited by examiner

*Primary Examiner* — Steven M Marsh
(74) *Attorney, Agent, or Firm* — Scott Harper; Harper & Bates LLP

(57) ABSTRACT

The present disclosure is directed to a modular furniture system comprising a modular unit capable of being removably affixed to a furniture member via at least one bracket assembly, the bracket assembly comprising a first bracket disposed on the modular unit and having a first magnetic component and at least one locking means; and a second bracket disposed on the furniture member and having a second magnetic component and a receiving means capable of engaging the at least one locking means.

13 Claims, 10 Drawing Sheets

MAGNETIC BRACKET ASSEMBLY FOR MODULAR FURNITURE SYSTEM

The present disclosure is generally directed to a modular furniture system, and more particularly, to a magnetic bracket assembly for connecting components of a modular furniture system.

BACKGROUND

Modular furniture systems allow customization of work spaces by allowing for the addition or removal of modular units such as panels, dividers, extensions pieces, and other components to or from furniture members. In conventional furniture systems, modular units may be appended to furniture members in one of two ways: 1) by permanently attaching the modular unit to the furniture member using screws; or 2) by removably attaching the modular unit to the furniture member via a screw-knob assembly. These conventional systems are not only difficult and burdensome to install, but they lack flexibility as they may only allow modular units to be attached in specified orientations.

SUMMARY

The present disclosure generally relates to modular furniture systems, and particularly to a magnetic bracket assembly for connecting a modular unit to a furniture member in a modular furniture system.

In an implementation, the modular furniture system may comprise a modular unit capable of being removably affixed to a furniture member via at least one bracket assembly, the bracket assembly comprising a first bracket disposed on the modular unit and having a first magnetic component and at least one locking means; and a second bracket disposed on the furniture member and having a second magnetic component and a receiving means capable of engaging the at least one locking means.

In another implementation, the bracket assembly may comprise a first bracket having a first magnetic component and at least one locking means; and a second bracket having a second magnetic component and a receiving means capable of engaging the at least one locking means.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

The present disclosure is generally directed to a modular furniture system, and more particularly, to a magnetic bracket assembly for connecting components of a modular furniture system. According to the present disclosure, the magnetic bracket assembly may allow a modular unit to be joined to or removed from a furniture member, while also providing flexibility and versatility in the modular furniture system.

Figure 1:
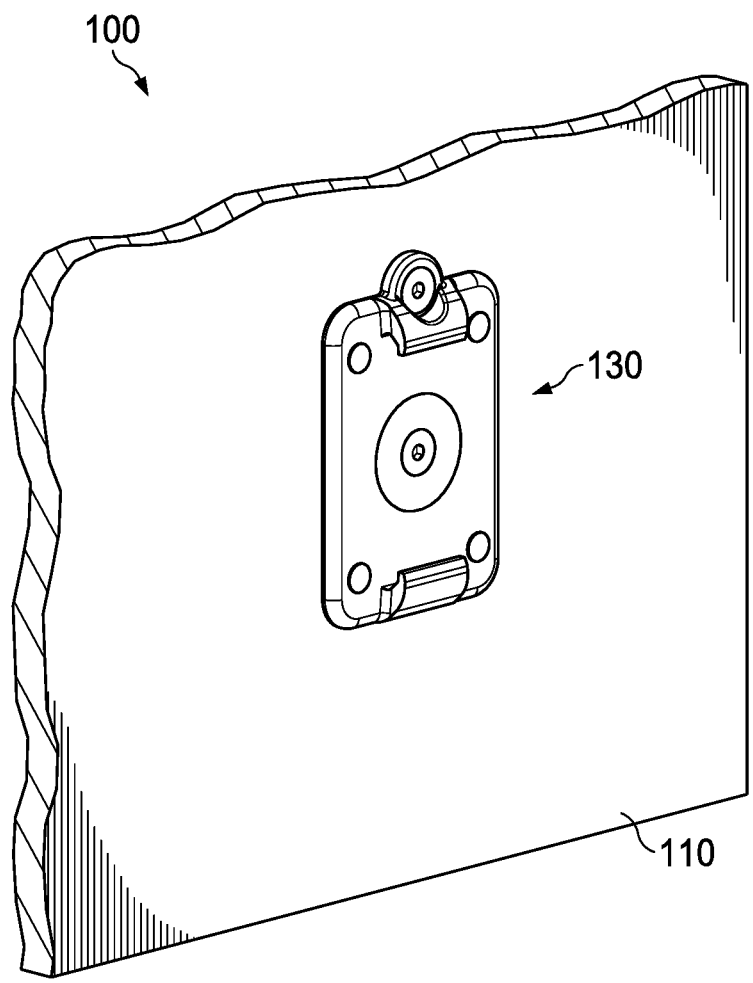
FIG. 1 illustrates perspective view of a magnetic bracket assembly for use in connection with a modular furniture system, according to the present disclosure.
Figure 1:
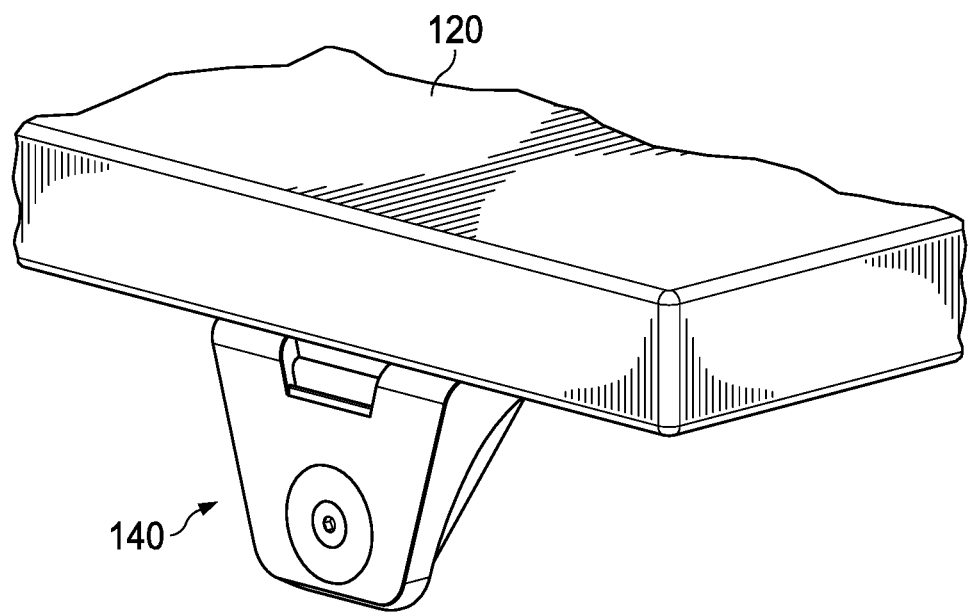

Reference is made to FIG. 1, which depicts a magnetic bracket assembly 100 for use in connection with a modular furniture system according to the present disclosure. Magnetic bracket assembly 100 may generally comprise a first bracket 130 which may be fixedly attached onto a modular unit 110 of a modular furniture system, and a second bracket 140 which may be fixedly attached onto a furniture member 120 of a modular furniture system. Modular unit 110 onto which first bracket 130 may be attached may comprise a divider, a privacy panel, a modesty panel, or any other component desired to be (or capable of being) appended to modular furniture system. Furniture member 120 onto which second bracket 140 may be attached may comprise a desk, a table, a shelving unit, or any other furniture structure. The first bracket 130 of the modular unit 110 and the second bracket 140 of the furniture member 120 may be configured to be mateably coupled to thereby join modular unit 110 with the furniture member 120. While the present disclosure may describe the magnetic bracket assembly 100 in singular terms (as a single magnetic bracket assembly having a first bracket 130 and a second bracket 140), the disclosure is not intended to be so limited. The modular furniture system of the present disclosure may utilize one or more magnetic bracket assemblies having a corresponding number of first and second brackets for use therewith.

Figure 2A:
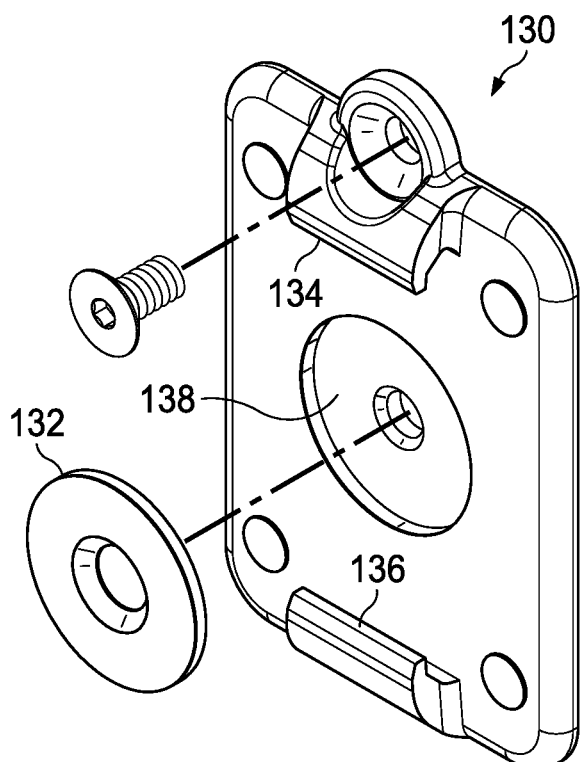
FIG. 2A illustrates a perspective view of a first bracket of a magnetic bracket assembly, according to the present disclosure.
Figure 2C:
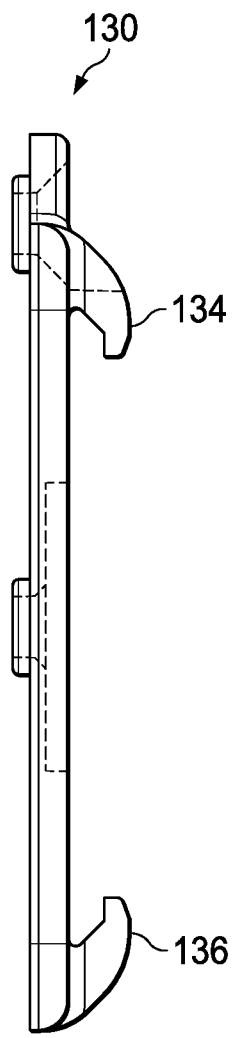
FIG. 2C illustrates a side view of a first bracket of a magnetic bracket assembly, according to the present disclosure.
Figure 2B:
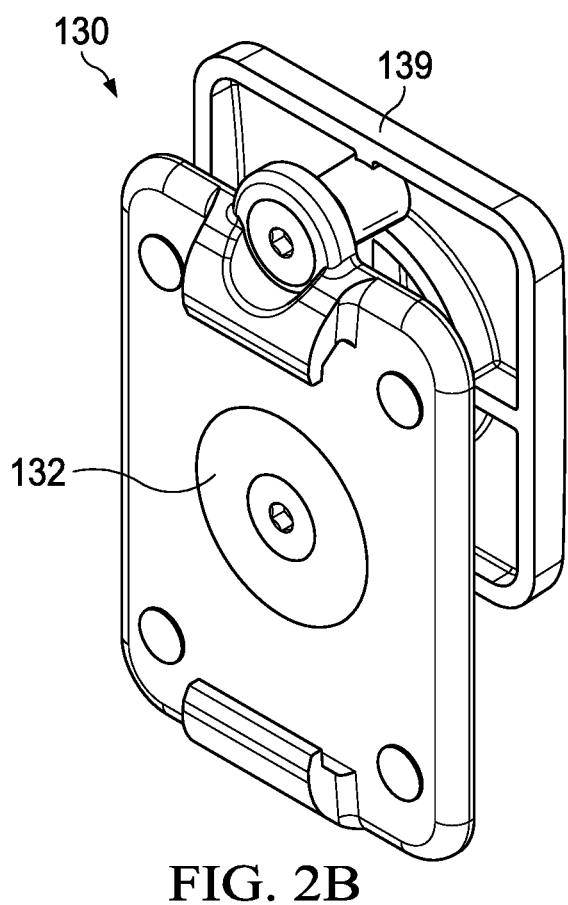
FIG. 2B illustrates perspective view of a first bracket of a magnetic bracket assembly having a cover, according to the present disclosure.

Reference is now made to FIGS. 2A, 2B, and 2C, which depict detailed views of a first bracket 130 of the magnetic bracket assembly 100, according to the present disclosure. As shown in FIG. 2A, first bracket 130 may comprise a first magnet 132 having a first magnetic pole (i.e., a north or south magnetic pole). First magnet 132 may comprise any variety of magnet known in the art. In an implementation, first magnet may comprise a N35-grade neodymium magnet with a thickness of 2 mm and a diameter of 25 mm. First magnet 132 may be disposed within first cutout 138, which may be specifically configured to the size and shape of first magnet 132. As shown in FIG. 2B, first magnet 132, when placed inside first cutout 138, may be substantially flush with the surface of first bracket 130.

First bracket 130 may further comprise first locking means 134 and second locking means 136. First and second locking means 134, 136 may each comprise a hook, a fastener, a peg, or other means to secure first bracket 130 with second bracket 140. By way of example, FIGS. 2A-2C depict first and second locking means 134, 136 as hooks.

In an implementation, and as shown in FIGS. 2A-2C, first and second locking means 134, 136 may be positioned at opposing ends of first bracket 130 and facing each other (i.e., in a symmetrical configuration). This allows first bracket 130 to operate in at least two orientations (upside down or right-side up) on modular unit 110, thereby increasing the versatility of the modular furniture system. Alternatively, in another implementation, first bracket 130 may comprise a single locking means. In yet another implementation, first bracket 130 may comprise a plurality of locking means in various configurations to further increase versatility of the modular furniture system (e.g., four locking means arranged on four sides of first bracket 130).

Figure 3A:
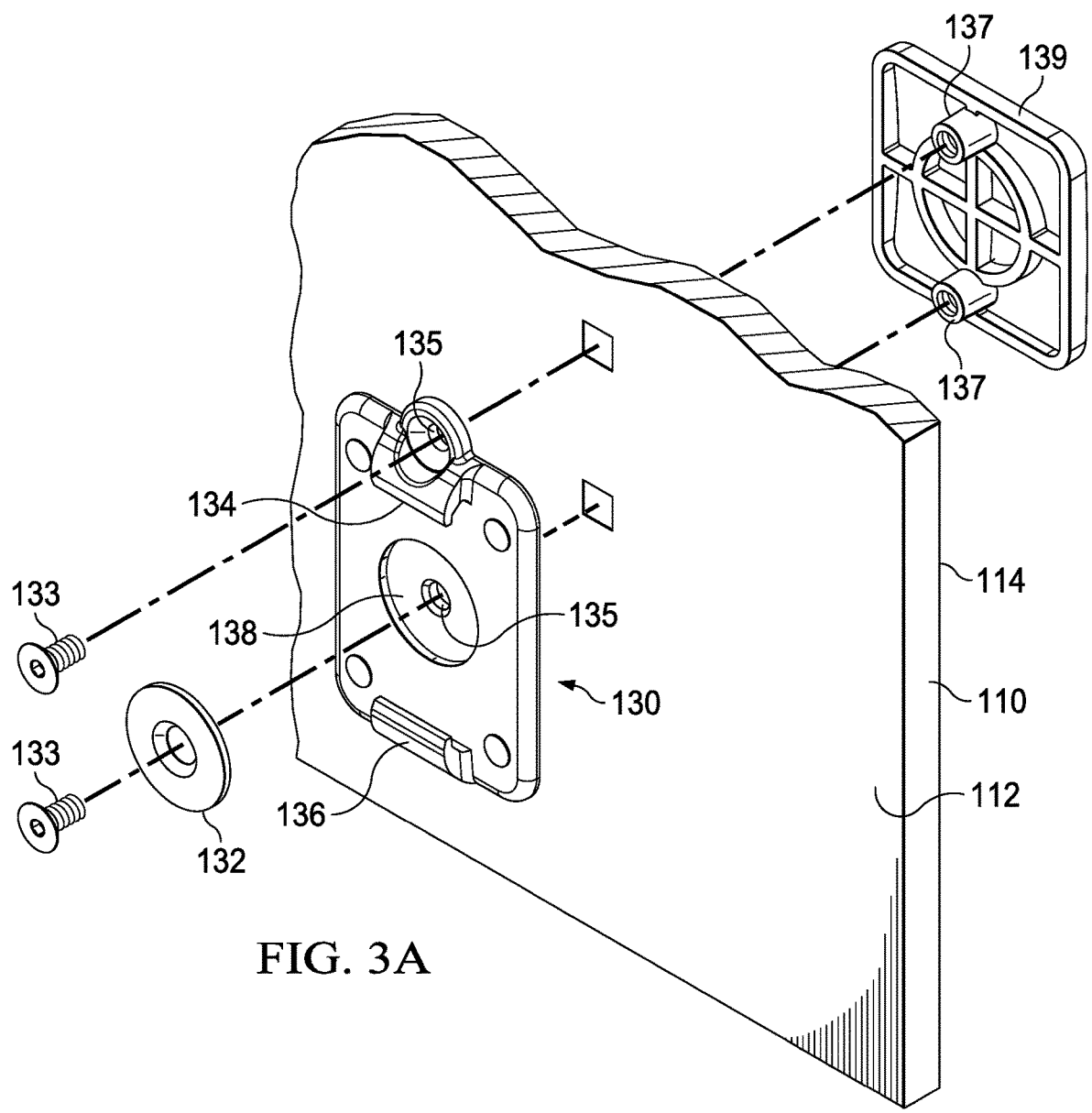
FIG. 3A illustrates a perspective view of a first bracket of a magnetic bracket assembly and its cover as attached to a modular unit, according to the present disclosure.
Figure 3B:
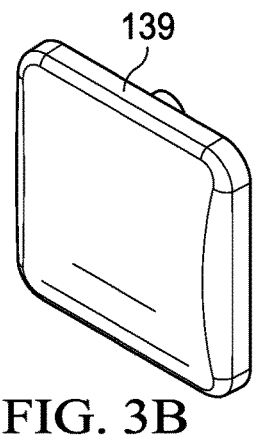
FIG. 3B illustrates a perspective view of a cover of a first bracket of a magnetic bracket assembly, according to the present disclosure.

Reference is now made to FIG. 3A, which depicts first bracket 130 of the modular bracket assembly 100 affixed onto a back surface (or bottom side) 112 of modular unit 110 of a modular furniture system. First bracket 130 may further comprise at least two screw holes 135 configured to receive at least two screws 133. Screws 133 may affix first bracket 130 and first magnet 132 to modular unit 110. With further reference to FIG. 3A, cover 139 (the inside of which is shown in FIG. 3A) may be affixed to a front surface (or top side) 114 of modular unit 110. Cover 139 may comprise at least two holes 137 to receive screws 133 inserted through first bracket 130 through the back surface 112 of the modular unit 110 to the front surface 114 of modular unit 110. FIG. 3B depicts an exemplary outside surface of cover 139. The smooth outside surface of cover 139 conceals screws 132 and screw holes 135 of the first bracket 130.

Figure 4A:
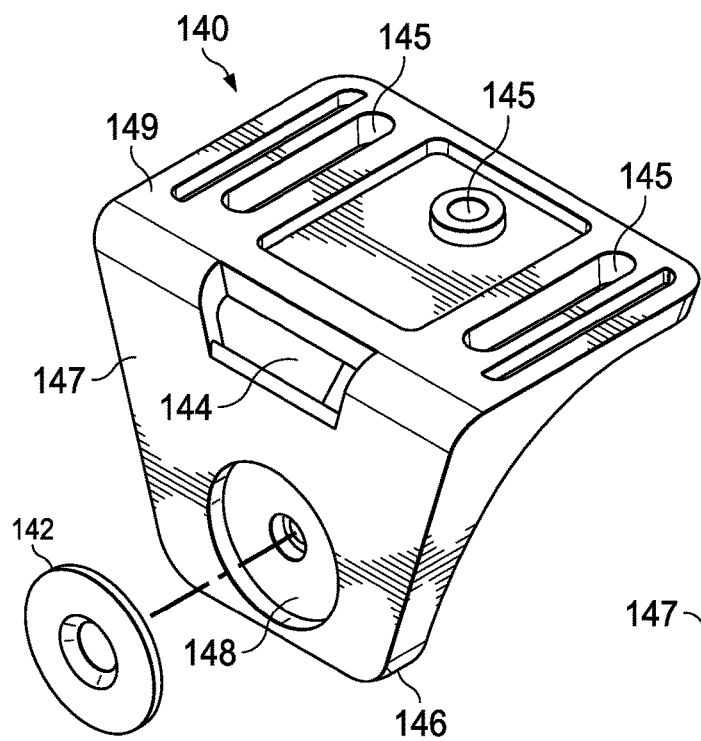
FIG. 4A illustrates a perspective view of a second bracket of a magnetic bracket assembly, according to the present disclosure.
Figure 4C:
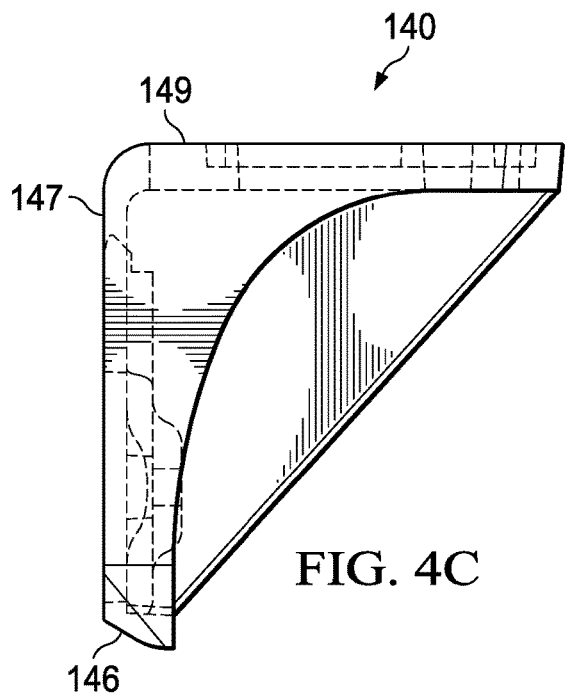
FIG. 4C illustrates a side view of a second bracket of a magnetic bracket assembly, according to the present disclosure.
Figure 4B:
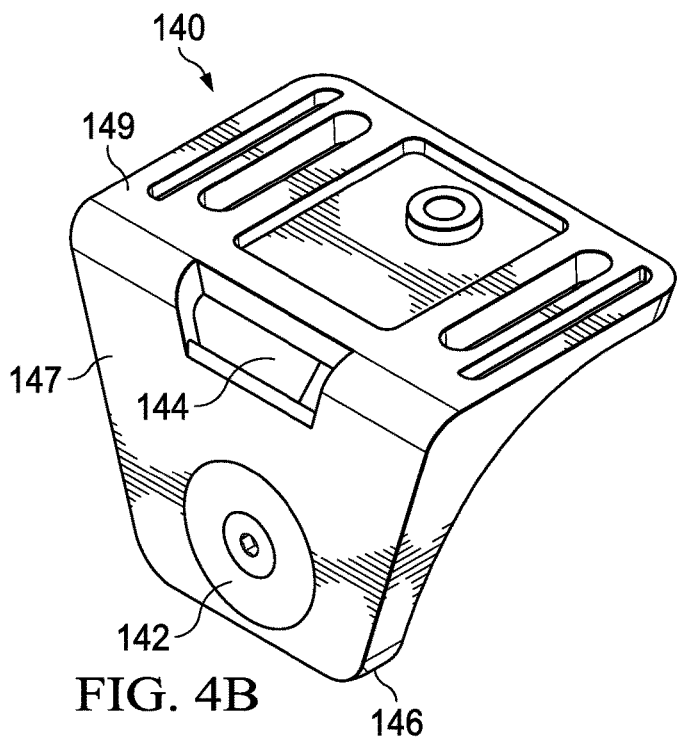
FIG. 4B illustrates another perspective view of a second bracket of a magnetic bracket assembly, according to the present disclosure.

Reference is now made to FIGS. 4A-4C, which depict detailed views of second bracket 140, according to the present disclosure. Second bracket 140 may comprise a L-shaped bracket having a first surface 147 and a second surface 149. First surface 147 of second bracket 140 may be configured to mateably couple with first bracket 130. Second surface 149 of second bracket 140 may be configured for attachment onto furniture member 120.

With continued reference to FIGS. 4A-4C, second bracket 140 may further comprise a second magnet 142 having a second magnetic pole which is opposite to the magnetic pole of first magnet 132. Therefore, if the first magnet 132 of first bracket 130 has a north magnetic pole, the second magnet 142 of second bracket 140 may comprise a south magnetic pole. Due to their opposing magnetic poles, first and second magnets 132, 142 may attract and may pull toward each other when aligned in close proximity. Second magnet 142 may comprise any variety of magnet known in the art. In an implementation, second magnet 142 may comprise a N35-grade neodymium magnet with a thickness of 3 mm and a diameter of 25 mm. Second magnet 142 may be disposed within second cutout 148, which may be configured to the size and shape of second magnet 142. As shown in FIG. 4B, second magnet 142, when placed inside second cutout 148, may be substantially flush with the surface of second bracket 140.

Second bracket 140 may further comprise a receiving means 144 capable of receiving and engaging first or second locking means 134, 136. Receiving means 144 may comprise a groove, a cut-out, or other such means for receiving first or second locking means 134, 136, thereby securing first and second brackets 130, 140 to each other. In an implementation, if there are more than one locking means (e.g., first and second locking means 134, 136) in first bracket 130, receiving means may be configured to receive any one of the locking means. This may allow for installation of the modular unit 110 onto the furniture member 120 in various orientations. For example, the coupling of first locking means 134 of the first bracket 130 to receiving means 144 of the second bracket 140 may result in the installation of the modular unit 110 in an upward direction to function as a privacy panel, and the coupling of the second locking means 136 to the receiving means 144 may result in the installation of the modular unit in a downward direction to function as a modesty panel. Thus, the present disclosure contemplates a magnetic bracket assembly 100 configured for multi-functional capability.

Reference is now made to FIG. 4C, which depicts a side view of second bracket 140. Second bracket 140 may further comprise a disengagement means (such as a ramp) 146 configured on a bottom edge of its first surface 147. As described in detail below, disengagement means (such as a ramp) 146 may assist in the disengagement of the first bracket 130 from the second bracket 140, thereby separating modular unit 110 from furniture member 120.

Figure 5:
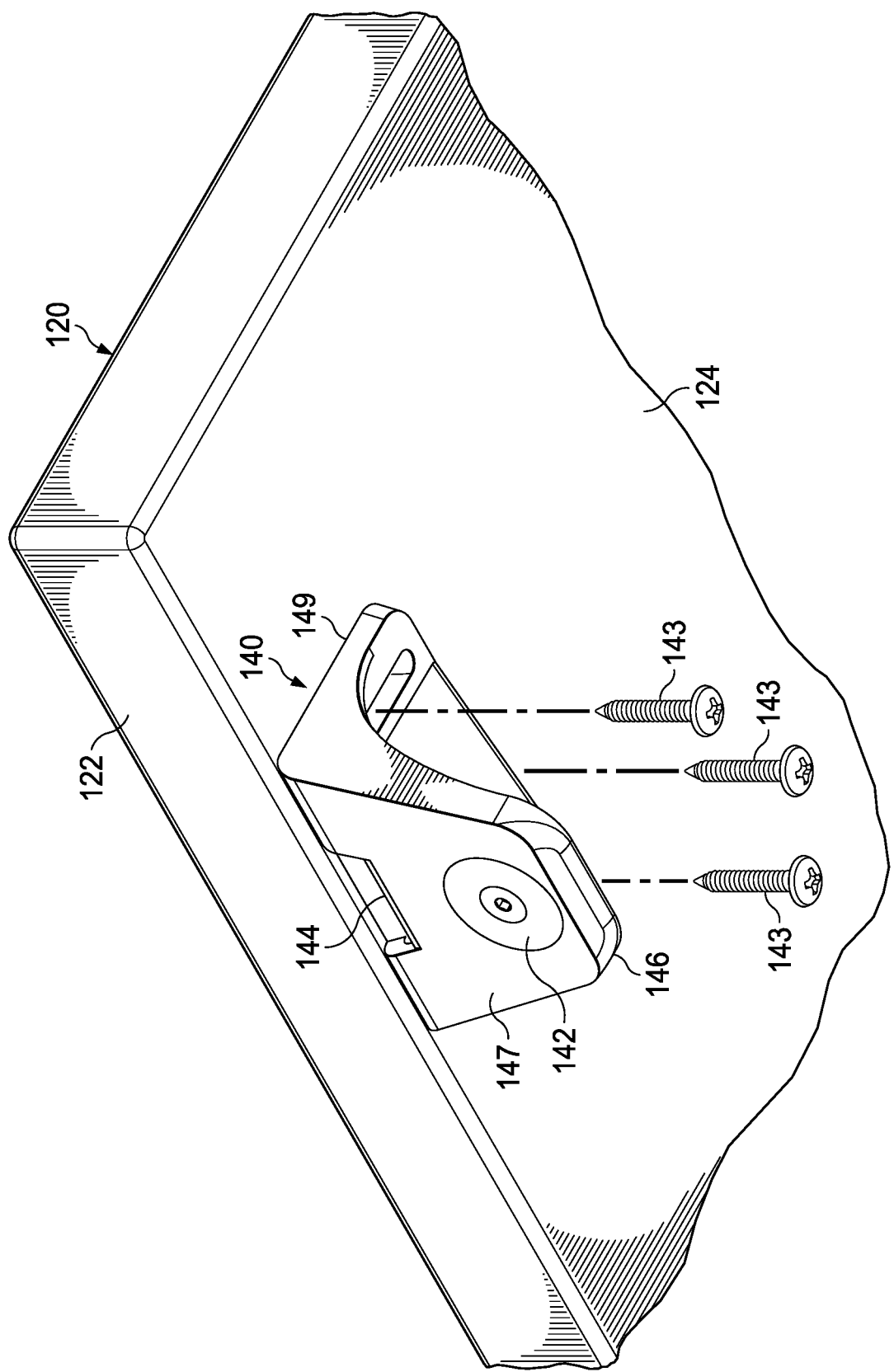
FIG. 5 illustrates a second bracket of a magnetic bracket assembly as attached to a furniture member, according to the present disclosure.

With reference now to FIG. 5 (in conjunction with FIG. 4A), second bracket 140 of the modular bracket assembly 100 is depicted as affixed onto an underside 124 of furniture member 120 (such a desk). Second bracket 140 may be positioned along an edge 122 of furniture member 120, with the first surface 147 of the second bracket 140 substantially flush with the edge 122 of the furniture member 120 and second surface 149 of second bracket 140 positioned against the underside 124 of the furniture member 120. As such, second magnet 142 may face outward so that it may attach to first magnet 132 on first bracket 130. Second bracket 140 may be affixed onto furniture member 120 via one or more screws 143 disposed within one or more holes/slots 145 on second surface 149 of second bracket 140.

Figure 6:
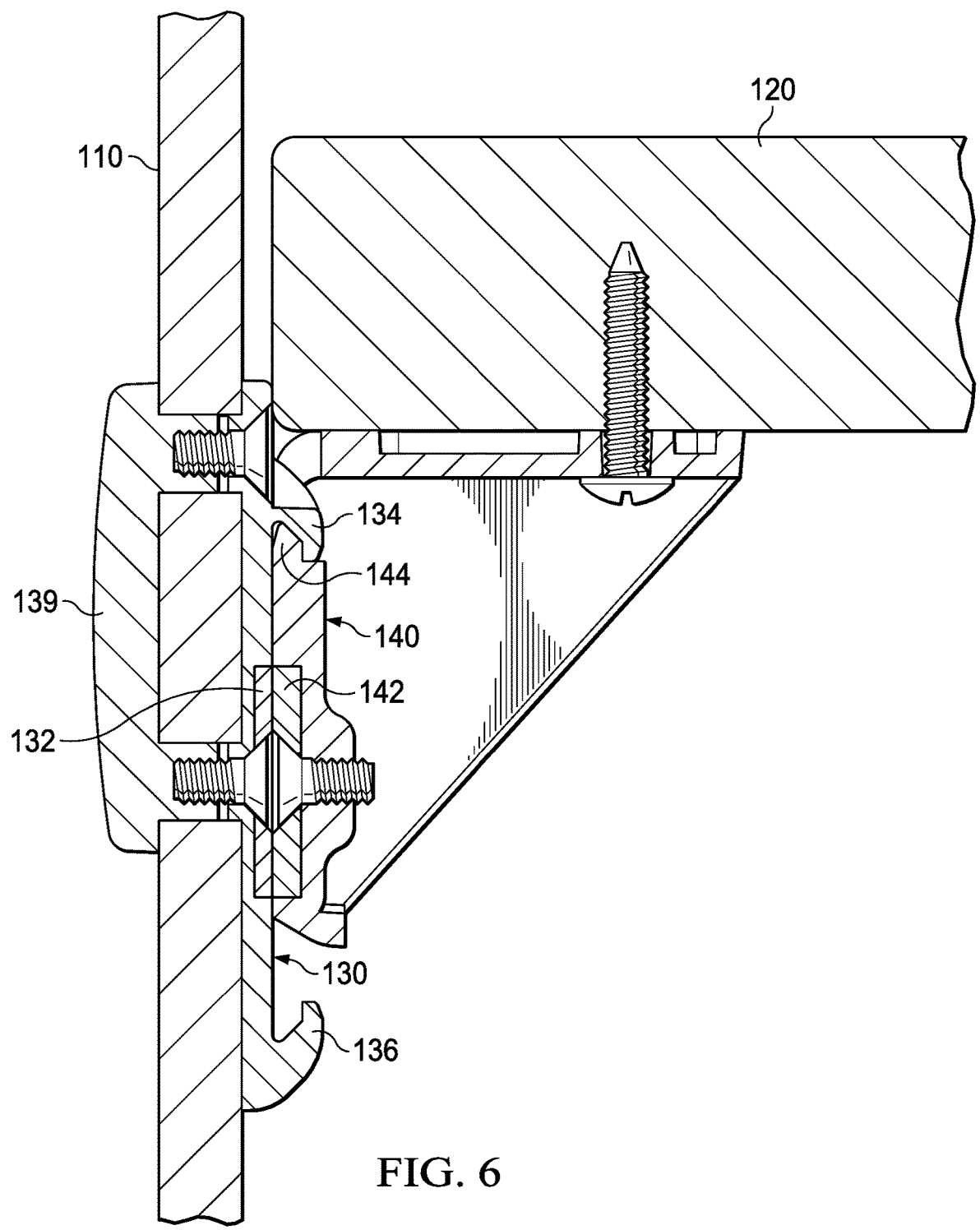
FIG. 6 illustrates a cutaway view of an assembled magnetic bracket assembly, according to the present disclosure.

Reference is now made to FIG. 6, which depicts a cutaway view of a magnetic bracket assembly 100 in an engaged/locked position according to the present disclosure. In operation, when the first and second brackets 130, 140 are positioned in close proximity and generally facing each other, the first and second magnets 132, 142 disposed within first and second brackets 130, 140 pull together due to their magnetic attraction. As the first and second magnets 132, 142 engage, the first locking means 134 (or second locking means 136, if first bracket 130 was inverted) engages receiving means 144, thereby securing the first and second brackets 130, 140 into a unitary configuration. As a result, the modular unit 110 is secured to the furniture member 120.

Figure 7:
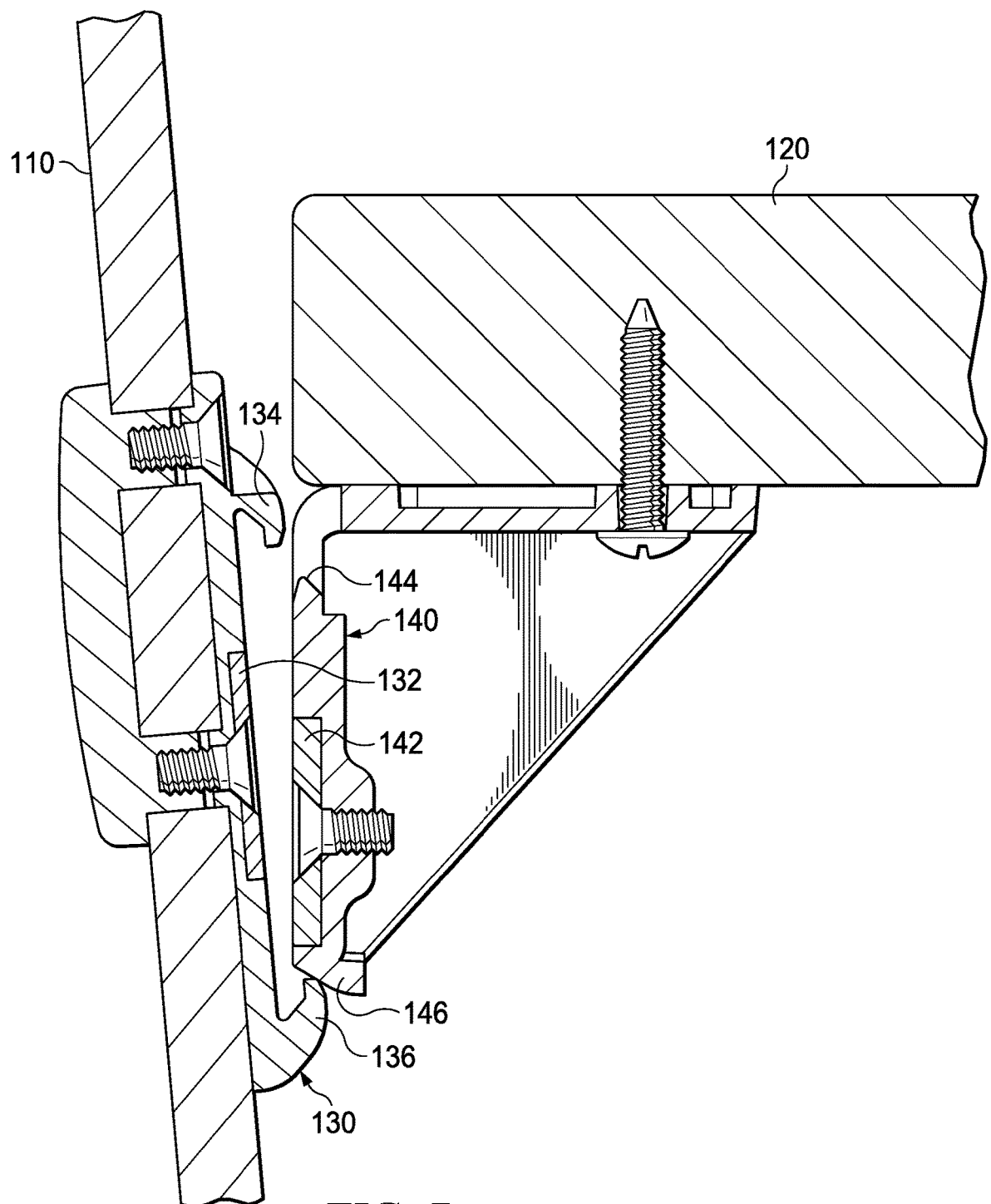
FIG. 7 illustrates a cutaway view of a disassembled magnetic bracket assembly, according to the present disclosure.

Reference is now made to FIG. 7, wherein is shown a cutaway view of a magnetic bracket assembly 100 in a disengaged/unlocked position according to the present disclosure. To separate the modular unit 110 from the furniture member 120, the modular unit 110 may be lifted upward (or an upward pressure applied) to disengage first locking means 134 from the receiving means 144. As the modular unit 100 is lifted up, the second locking means 136 will contact the disengagement means (such as a ramp) 146 on the second bracket 140 to assist in pushing the first and second magnets 132, 142 away from each other. As noted above, while FIGS. 6-7 depict first locking means 134 engaging the receiving means 144 to secure first and second brackets 130, 140 together, it may be understood that if the first bracket 130 is inverted, second locking means 136 may engage the receiving means 144 to secure the first and second brackets 130, 140 together. In such case, when the bracket assembly is disengaged, first locking means 134 will contact disengagement means (such as a ramp) 146 to disengage the first and second magnets 132, 142, and therefore first and second brackets 130, 140 from each other. It is to be understood that while FIG. 7 depicts disengagement means 146 as a ramp, the present disclosure is not intended to be so limited. Various structures may operate as a disengagement means to facilitate disengagement of the first and second magnets 132, 142 and/or first and second brackets 130, 140 without departing from the spirit or scope of the present disclosure.

Figure 8A:
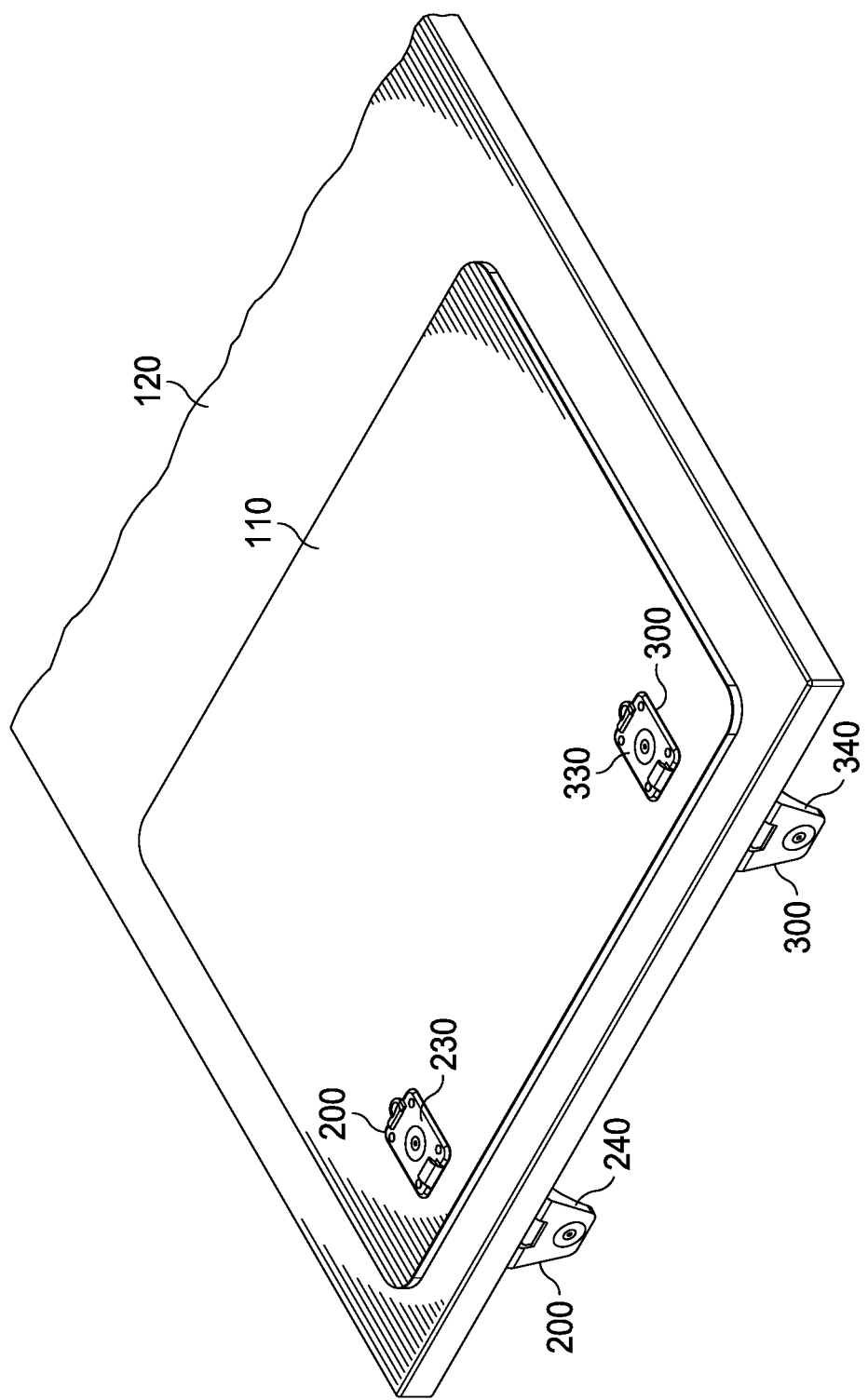
FIG. 8A illustrates a perspective view of a plurality magnetic bracket assemblies for use in connection with a modular furniture system, according to the present disclosure.
Figure 8B:
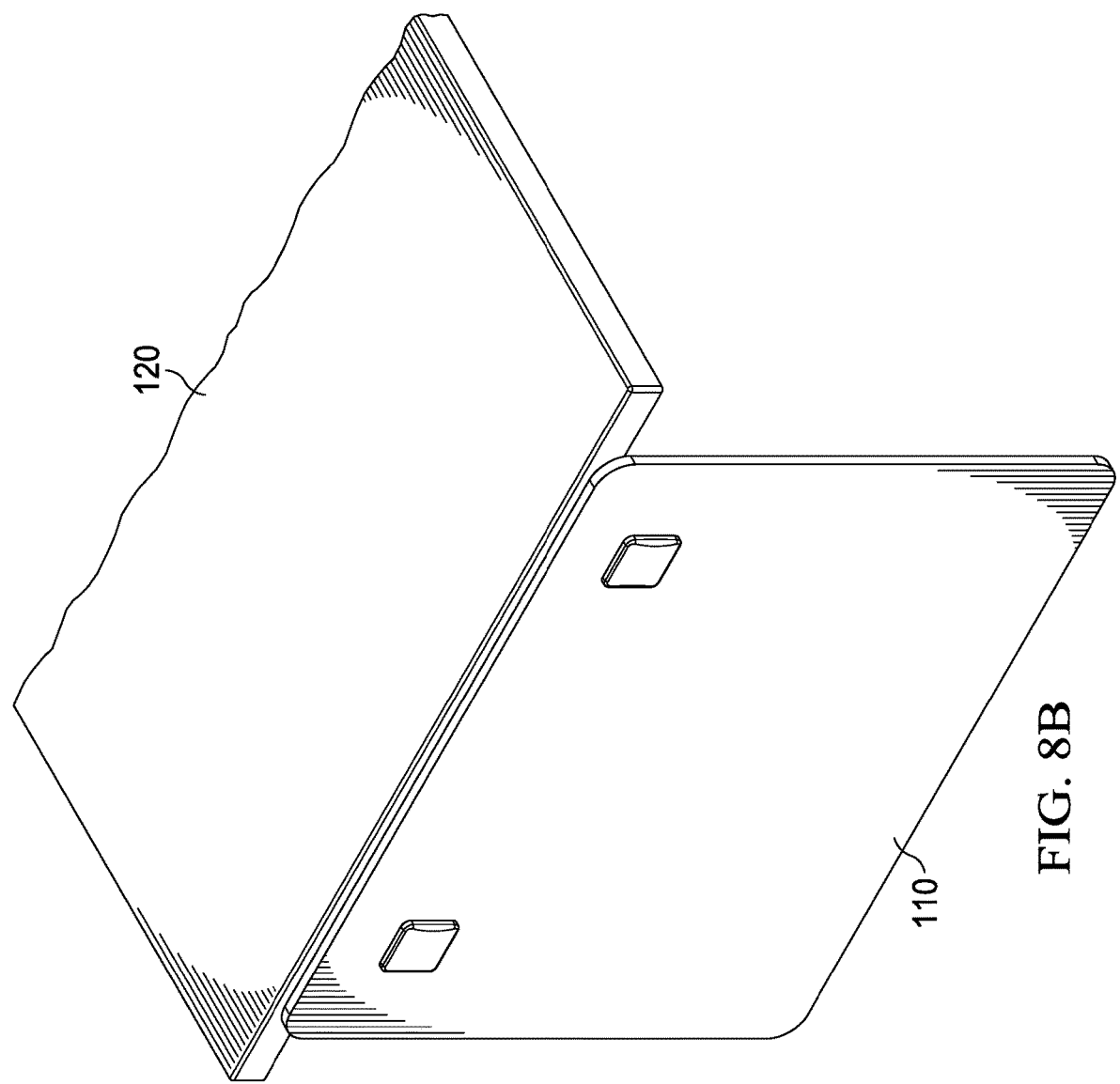
FIG. 8B illustrates a perspective view of a modular unit arranged in a downward configuration, according to the present disclosure.
Figure 8C:
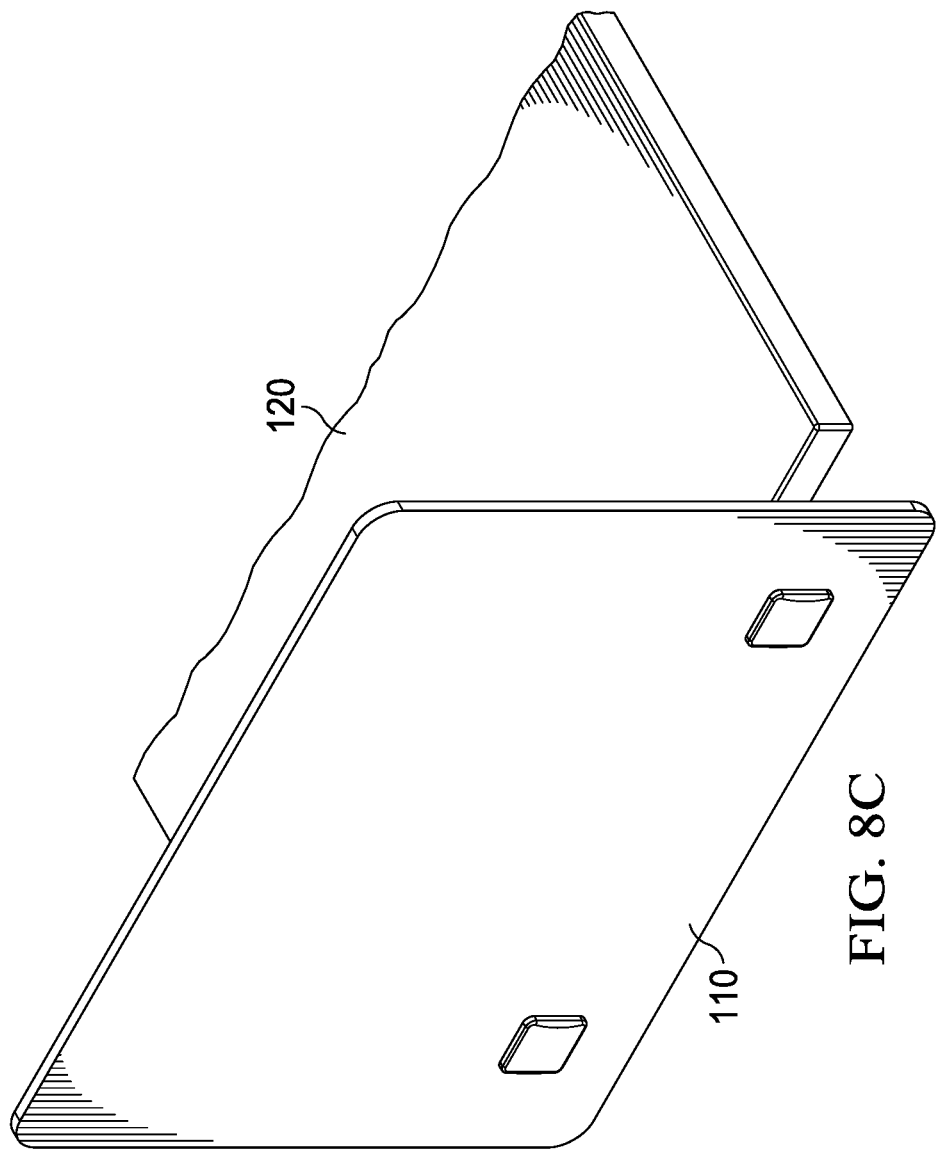
FIG. 8C illustrates a perspective view of a modular unit arranged in an upward configuration, according to the present disclosure.

Reference is now made to FIG. 8A, which depicts the use of multiple magnetic bracket assemblies 200, 300 according to the present disclosure. Because modular units may be fashioned in various sizes and shapes, one or more magnetic bracket assemblies may be used to support and affix a modular unit 110 to a furniture member 120. By way of example, FIGS. 8A-8C shows first and second magnetic bracket assemblies 200, 300 to affix a modular unit 110 to a furniture member 120. First and second magnetic bracket assemblies 200, 300 may comprise first brackets 230, 330 affixed to a modular unit 110 and second brackets 240, 340 affixed to a furniture member 120. Where multiple bracket assemblies are desired, it must be noted that the orientation and distance between the first brackets 230, 330 must correspond to the orientation and distance between the second brackets 240, 340. This ensures that the first brackets 230, 330 mateably couple with second brackets 240, 340 of the magnetic bracket assemblies 100, 200. Magnetic bracket assemblies 100, 200 may comprise all of the components discussed above with respect to magnetic bracket assembly 100. As such, first brackets 230, 330 may engage and disengage with second brackets 240, 240 in the same manner discussed above with respect to first bracket 130 and second bracket 140.

Referring now to FIGS. 8B and 8C, the magnetic bracket assemblies according the present disclosure allow versatility as modular unit 110 may be coupled to furniture member 120 in a variety of orientations such as, e.g., in downward (FIG. 8B) or upward (FIG. 8C) positions. Although not shown in the Figures, the modular unit 110 may also be oriented in left-facing or right-facing (horizontal) positions, simply by affixing second brackets 240, 340 along a vertical edge of furniture member 120. Thus, a variety of orientations and configurations may be achieved by the magnetic bracket assembly of the present disclosure.

While the magnetic bracket assembly of the present disclosure is described and shown in connection with a modular furniture system, it is to be understood that the magnetic bracket assembly is not intended to be so limited, and may be used, fashioned, and/or applied in contexts outside the field of modular furniture systems.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A modular furniture system comprising:
   a modular unit capable of being removably affixed to a furniture member via at least one bracket assembly, the bracket assembly comprising,
   a first bracket having at least one screw hole configured to receive at least one screw for attaching the first bracket to a first surface of the modular unit, and having a first magnetic component and at least one locking means;
   a cover located on an opposing surface of the modular unit to the first surface of the modular unit for receiving the at least one screw attached to the first bracket; and
   a second bracket attached to the furniture member and having a second magnetic component and a receiving means capable of engaging the at least one locking means.

2. The modular furniture system of claim 1, wherein the first and second magnetic components have attracting magnetic poles capable of joining the first and second magnetic components together, thereby securing the first bracket to the second bracket.

3. The modular furniture system of claim 2, wherein when the first and second magnetic components join together, the at least one locking means of the first bracket engages the receiving means of the second bracket, thereby further securing the first bracket to the second bracket.

4. The modular furniture system of claim 3, wherein the securing of the first bracket to the second bracket affixes the modular unit to the furniture member.

5. The modular furniture system of claim 3, wherein the first bracket may be separated from the second bracket by disengaging the at least one locking means from the receiving means.

6. The modular furniture system of claim 5, wherein the at least one locking means may be disengaged from the receiving means by lifting the modular unit away from the furniture member.

7. The modular furniture system of claim 5, wherein the second bracket further comprises:
   a disengagement means configured to facilitate disengagement of first and second magnetic components.

8. The modular furniture system of claim 1, wherein the at least one locking means comprises a hook.

9. The modular furniture system of claim 8, wherein the receiving means comprises an opening for inserting the hook.

10. The modular furniture system of claim 1, wherein the modular unit is a selected one from a group consisting of:
    a privacy panel, a divider, or a modesty panel.

11. The modular furniture system of claim 1, wherein the furniture member comprises:
    a work station.

12. The modular furniture system of claim 1, wherein the first and second brackets are affixed to the modular unit and the furniture member, respectively, via one or more screws.

13. The modular furniture system of claim 1, wherein the first bracket comprises:
    a second locking means for securing the first bracket to the second bracket in an alternate orientation.

* * * * *